November 11, 1969

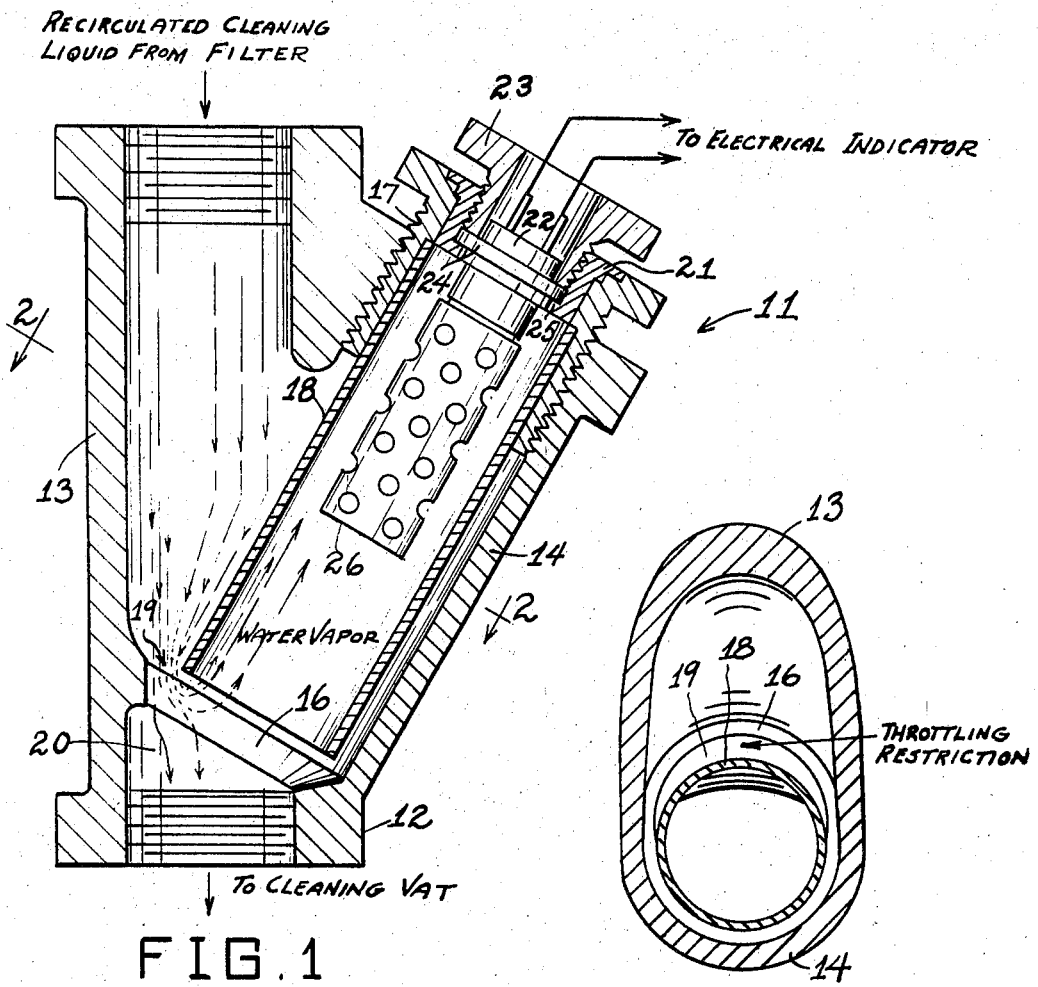

United States Patent Office 3,477,279
Patented Nov. 11, 1969

3,477,279
FLUID HYGROMETRIC SAMPLING DEVICE
Leopold Perlaky, Lanham, Md., assignor to Hygrodynamics, Inc., Silver Spring, Md.
Filed June 5, 1967, Ser. No. 643,497
Int. Cl. G01n 11/02
U.S. Cl. 73—61.1      10 Claims

ABSTRACT OF THE DISCLOSURE

A moisture detector for a dry cleaning fluid circulating system, consisting of a Y-fitting with a first leg connected directly in the main flow conduit between the recirculation filter and the cleaning vat of the system, and the other leg containing a cylindrical sleeve projecting convergently into the path of flow through the first leg. The inner end of the sleeve projects close to the junction of the bores of the two legs so as to define a restriction or nozzle and to cause vaporization of water carried by the recirculating cleaning fluid, the water vapor diffusing into the sleeve. An electrical humidity sensing element is mounted inside the sleeve and is exposed to water vapor entering the sleeve. The sensing element is connected to an external electrical indicator to provide a quantitative measurement of the amount of water in the recirculated cleaning fluid.

---

This invention relates to moisture detecting systems, and more particularly to devices for detecting the amount of moisture in a fluid employed in the processing of material.

A main object of the invention is to provide a novel and improved moisture detector for measuring the amount of moisture in a circulating fluid, the detector being very simple in construction, involving no moving parts, being compact in size, and being substantially non-clogging.

A further object of the invention is to provide an improved self-cleaning electrical moisture detecting unit for use in a system employing a circulating fluid which may contain moisture and wherein it is desirable to continuously monitor the amount of moisture in the circulating fluid, the device being especially suitable for use in relatively low-pressure systems using relatively large fluid flow rates, such as in the main conduit connecting the recirculation filter to the cleaning vat of a dry cleaning plant, the device providing accurate indications of the amount of moisture in the circulating fluid so that necessary adjustments of the moisture content of the fluid can be made.

A still further object of the invention is to provide an improved moisture measuring device for use in a fluid circulating system, such as in a dry cleaning plant, the device involving relatively inexpensive parts, being easy to install, and being arranged so that its sensing element can be easily replaced whenever necessary without interfering with the operation of the other parts of the associated system.

Further objects and advantages of the invention will become apparent from the following description and claims, and from the accompanying drawings, wherein:

FIGURE 1 is a vertical cross-sectional view taken through an improved moisture measuring device constructed in accordance with the present invention.

FIGURE 2 is a cross-sectional view taken substantially on line 2—2 of FIGURE 1.

A moisture detecting device for use in a dry cleaning fluid circulating system is disclosed in U.S. Patent No. 3,077,105 to C. E. Ohlheiser. This prior art device has certain shortcomings, mainly, that it cannot be used directly in the main fluid line of a dry cleaning system. This is due to the fact that it employs a relatively long constricted annular throttling passage, whereby a relatively high differential pressure must exist across the device for normal operation. Because of its high resistance to flow, the device of U.S. Patent No. 3,077,105 must be used in a sampling branch circuit connected across points having a substantial pressure differential, rather than directly in the main flow line. The device of the present invention eliminates the need for employing a sampling branch circuit. Thus, the device of the present invention can be used in low pressure systems and can be placed, for example, directly in the large pipe line leading from the filter to the cleaning vat of a dry cleaning plant, utilizing relatively large fluid flow rates because of the relatively large size of the conduit in which it is mounted, and providing increased sensitivity to moisture changes.

Referring to the drawings, 11 generally designates an improved moisture detector according to the present invention. The device 11 comprises a Y-fitting 12 having a main leg 13 and an integral side leg 14 converging with main leg 13 at an angle of about 30°. The bores of the legs 13, 14 converge internally toward a generally oval bevelled common junction passage 16 which is inclined to the horizontal at an angle of about 30°, as shown in FIGURE 1, and whose plane is substantially normal to the axis of leg 14.

Threadedly secured in the top end of side leg 14 is a bushing member 17 in which is rigidly secured a cylindrical sleeve 18 which projects convergently into the path of flow provided for fluid in the first leg 13, said sleeve terminating very close to the top plane of the bevelled passage 16. For example, the lower end of sleeve 18 may be between $\frac{1}{8}$ and $\frac{1}{16}$ inch from the top plane of the bevelled passage. As shown in FIGURE 1, the sleeve 18 has a diameter only slightly smaller than the inside diameter of leg 14. Thus, the sleeve 18 defines a convergent restriction or nozzle with respect to main leg 13, said restriction or nozzle including the generally crescent-shaped orifice 19. When cleaning fluid containing water flows through this convergent restriction, it is formed into a thin-walled sheet immediately below the orifice 19, whereby the fluid is thinly spread out and exposed so that water contained therein is readily vaporized and moves into the expansion space 20 beneath the orifice. The water vapor diffuses into the interior of sleeve 18.

Rigidly secured in the top portion of bushing 17 is an internally threaded annular supporting cup 21. A socket 22 is clamped in cup 21 by an annular clamping ring 23 threadedly engaged in cup 21 and bearing clampingly on an annular flange 24 provided on socket 22, said flange 24 being thereby clamped against the inwardly directed bottom lip 24 of cup 21. Mounted in the socket and being thus supported substantially coaxially within the upper portion of sleeve 18 is a conventional electrical humidity sensing element 26.

As shown in FIGURE 1, the sensing element 26 is spaced a substantial distance from the open bottom end of sleeve 18, so that it is protected against direct contact with liquid flowing through main leg 13.

The water vapor evaporating from the liquid and diffusing into the interior of sleeve 18 acts on the electrical humidity sensing element 26 and produces a signal which is observed on an external indicator to which the sensing element is connected. The magnitude of the signal will be in accordance with the amount of water vapor generated, and this will vary in accordance with the amount of water contained in the cleaning fluid passing through the orifice 19.

As will be readily understood, the main leg 13 may be connected directly in the main flow conduit of the cleaning fluid. Thus, the top end of the main leg 13 may be connected to the conduit leading from the recirculation filter of the system, and the bottom end of leg 13 (the stem of the Y-fitting) may be connected to the conduit leading to the cleaning vat. Thus, the recirculated cleaning fluid can be monitored continuously to determine the amount of water contained therein and necessary adjustments can be made as required to maintain the water content within desired limits.

When the fluid passes through the crescent-shaped orifice 19 it discharges into the space 20 in the form of a rapidly moving relatively thin substantially oval-shaped jet of liquid, freeing molecules of water vapor at a vapor pressure proportional to the amount of water contained in the fluid and causing a relative humidity of measurable value to exist within the sleeve 18. Since sensing element 26 is exposed to the water vapor, said element will respond to vary its resistance in accordance with the amount of moisture present in an inverse manner well known to those skilled in the art.

While a specific embodiment of an improved moisture detector has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A moisture detector comprising a conduit fitting having a main leg and a side leg convergently connected to said main leg, the inner bores of the main leg and side leg merging and being formed with a common junction passage portion leading to the outlet of said main leg, a sleeve member mounted in said side leg and terminating adjacent said junction passage portion, the end edge of the sleeve member and said junction passage portion defining a constriction to liquid flow through said main leg, and an electrical humidity sensing element mounted in said sleeve member in a position to be exposed to water vapor derived from liquid flowing through said constriction.

2. The moisture detector of claim 1, and wherein said side leg is at an acute angle to said main leg and the axis of said sleeve member is substantially normal to the plane of said junction passage portion.

3. The moisture detector of claim 2, and wherein said junction passage portion is generally oval and the axis of the sleeve member is offset from the center of the junction passage portion.

4. The moisture detector of claim 3, and wherein said sleeve member is generally cylindrical, whereby said constriction is of generally arcuate shape.

5. The moisture detector of claim 4, and wherein said junction passage portion is bevelled with a taper converging away from said sleeve member.

6. The moisture detector of claim 5, and wherein said sleeve member converges with respect to the bore of the main leg and terminates a distance of the order of ⅛ inch from the upper plane of the junction passage portion.

7. The moisture detector of claim 5, and wherein said constriction is generally crescent-shraped.

8. The moisture detector of claim 7, and wherein said humidity sensing element is mounted in the end portion of the sleeve member opposite said junction passage portion.

9. The moisture detector of claim 8, and wherein the end portion of the sleeve member opposite said junction passage portion is provided with a socket located substantially axially in the sleeve member and said humidity sensing element is mounted in said socket and extends substantially axially in the sleeve member.

10. The moisture detector of claim 9, and wherein said side leg is provided with a removable bushing member, said sleeve member being rigidly secured coaxially in said bushing member, said bushing member having an annular supporting cup, said socket extending through said supporting cup and having a peripheral flange supportingly received in the cup, and an annular clamping ring threadedly engaged in the supporting cup and clampingly engaging said flange.

References Cited
UNITED STATES PATENTS

| 3,060,722 | 1/1960 | Migdal | 73—19 |
| 3,077,105 | 2/1963 | Ohlheiser | 73—61.1 |

RICHARD C. QUEISSER, Primary Examiner

C. E. SNEE, Assistant Examiner

U.S. Cl. X.R.

55—319